No. 629,229. Patented July 18, 1899.
C. C. BALLIN.
HUB FOR VEHICLE WHEELS.
(Application filed May 1, 1899.)
(No Model.) 3 Sheets—Sheet 1.
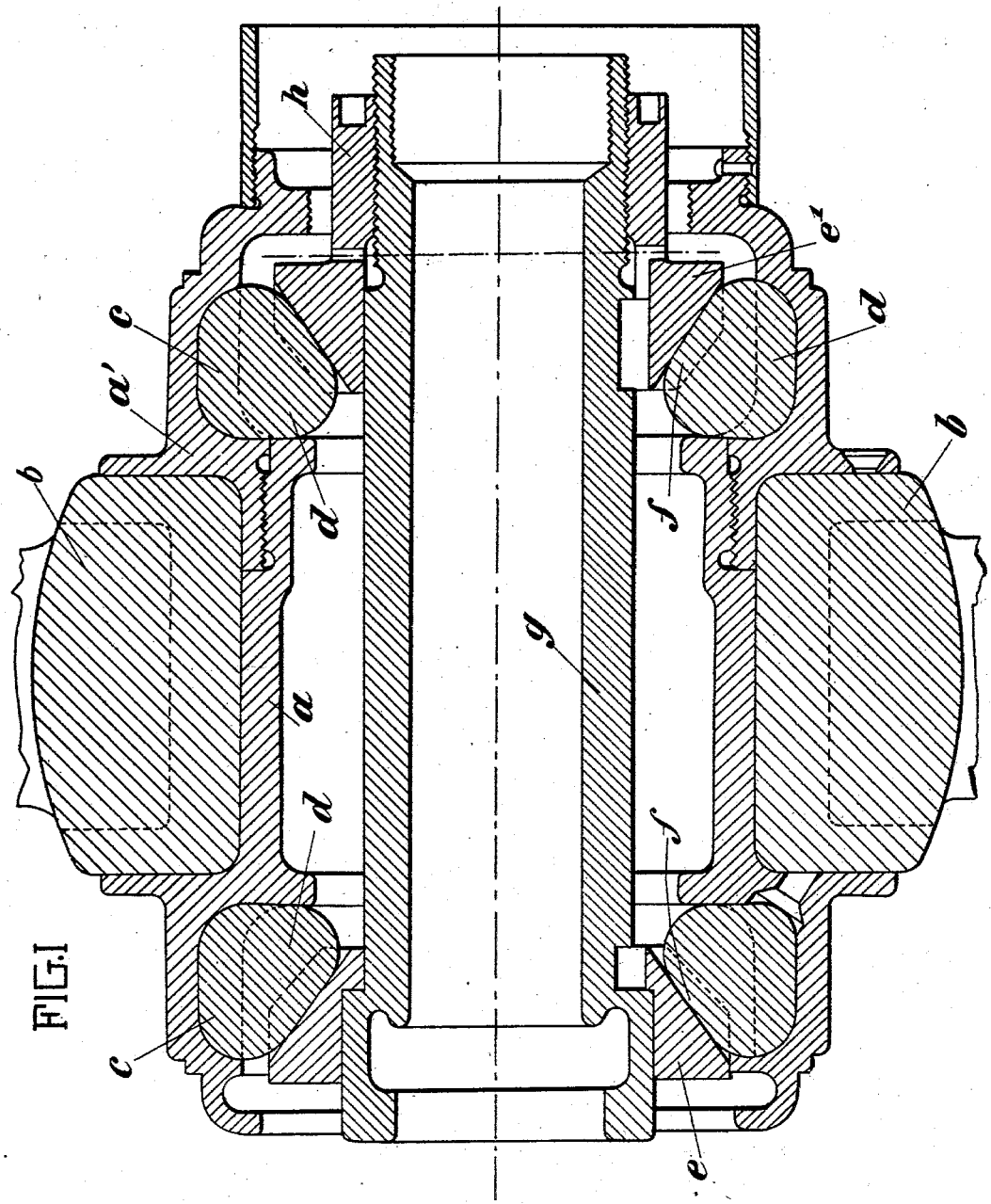

No. 629,229. Patented July 18, 1899.
C. C. BALLIN.
HUB FOR VEHICLE WHEELS.
(Application filed May 1, 1899.)
(No Model.) 3 Sheets—Sheet 2.
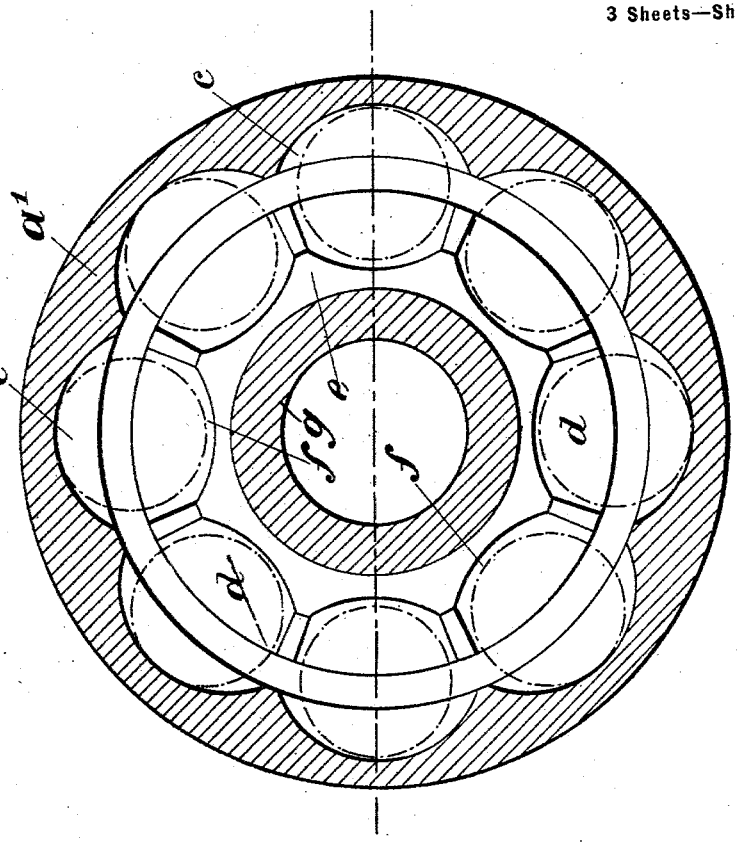
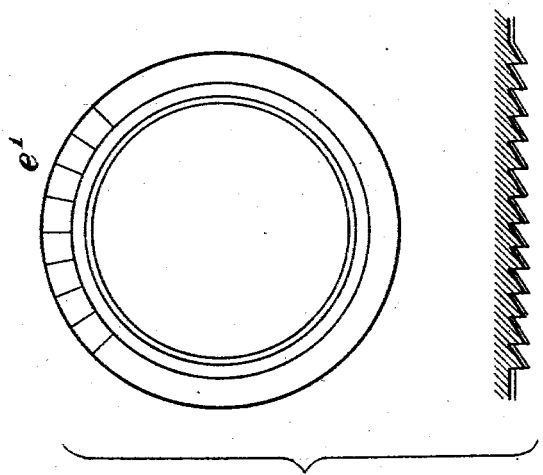
Witnesses.
Julius Lutz.
Dave B. Owens.
Inventor.
C. C. Ballin
By
Attorneys.

No. 629,229. Patented July 18, 1899.
C. C. BALLIN.
HUB FOR VEHICLE WHEELS.
(Application filed May 1, 1899.)
(No Model.) 3 Sheets—Sheet 3.
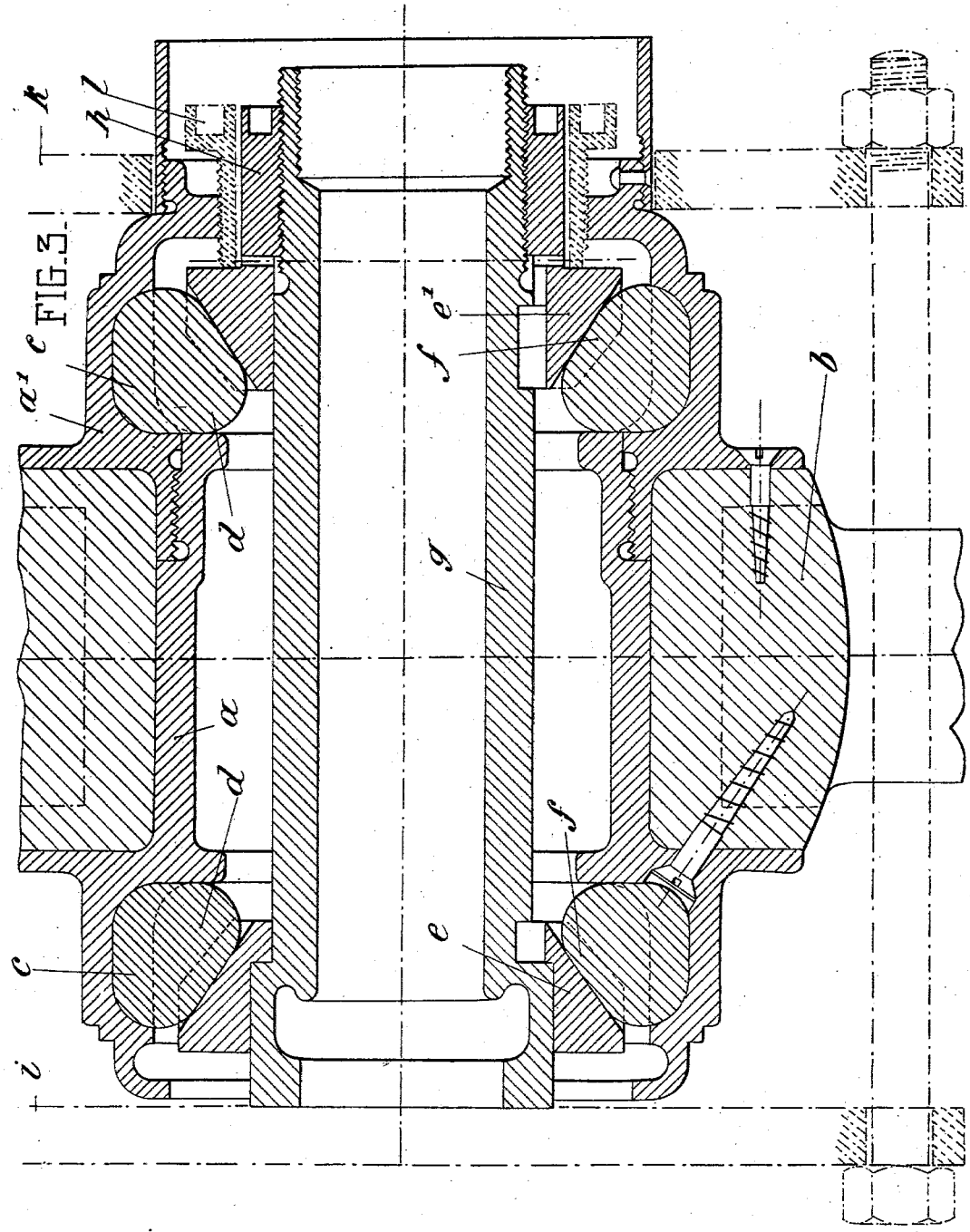

UNITED STATES PATENT OFFICE.

CASIMIR CONSTANT BALLIN, OF PARIS, FRANCE.

HUB FOR VEHICLE-WHEELS.

SPECIFICATION forming part of Letters Patent No. 629,229, dated July 18, 1899.

Application filed May 1, 1899. Serial No. 715,163. (No model.)

*To all whom it may concern:*

Be it known that I, CASIMIR CONSTANT BALLIN, of 5 Rue de Chateaudun, Paris, Republic of France, have invented Improvements in Antivibratory Elastic Naves for Vehicle-Wheels, of which the following is a full, clear, and exact description.

This invention relates to improvements in antivibratory elastic naves for the wheels of carriages and other vehicles.

The said invention is chiefly characterized by the interposition between the wheel-nave proper, which carries the spokes of the wheel, and the revolving socket supported on the axle, of an elastic non-metallic pad or cushion composed of a body of soft material—such, for example, as caoutchouc—to diminish the jolts, shocks, and mechanical vibrations and noises. This pad or cushion is advantageously formed by two series of caoutchouc balls arranged concentrically around the central socket and in the first place tightly packed in a chamber or race, the said pad or cushion being made in sections for the purpose of permitting the movements of compression at the moment of the shock to be effected by simple displacement of the elastic material itself and not by rubbing of this material on the walls which inclose it, as is the case with a continuous ring.

To enable the said invention to be readily understood, I have shown in the accompanying drawings, but as an example only, one form of the said elastic nave.

In the said drawings, Figure 1 shows in vertical longitudinal section the nave of an ordinary wooden wheel having my improvements applied thereto. Fig. 2 shows a vertical transverse section of the same. Fig. 3 is a similar view to Fig. 1, illustrating the method of subjecting the balls to a preliminary compression during construction. Fig. 4 shows a detail of construction.

Like letters indicate corresponding parts throughout the drawings.

In principle my apparatus is composed of an exterior socket, constructed in two parts $a\ a'$ in such a manner as to permit the said parts to be inserted in the wooden nave $b$, carrying the spokes, and fixed and secured on the said nave by coach-screws or other fastening devices. In the interior of the parts $a$ and $a'$, forming the said socket, segmental recesses $c$ are arranged to receive the spherical caoutchouc balls $d$. Cones $e\ e'$ are provided to secure and support the balls which are lodged in the recess $f$. These cones $e\ e'$ are threaded and keyed on the socket or sleeve $g$, which turns on the axle, the cone $e$ being fixed and resting against a shoulder near one end of the said socket $g$ and the cone $e'$ being free to slide but not to turn relatively to the said socket or sleeve $g$ and being held in place by the locking-nut $h$. The adjacent faces of both the nut $h$ and the cone $e'$ have similar toothed racks with inclined teeth, Fig. 4, cut thereon.

The teeth of the rack on the nut $h$ incline in an inverse direction to the screw-thread of the said nut, so that when the cone $e'$ is driven right home by the nut and the teeth of the racks are in engagement it is absolutely impossible for the nut to work loose.

In Fig. 3 I have shown in broken lines the necessary appliances for putting on and taking off the nut $h$. These appliances comprise a bridle $i$ and a counter-bridle $k$, intended to hold up the socket. A screw $l$ is provided to press on the movable cone $e'$ to release its rack from the corresponding rack on the nut $h$, and consequently to permit this latter to turn for screwing together or unscrewing. The pressure obtained by this nut $l$ ought to be sufficient to compress the balls to an amount varying according to the depth of the teeth of the rack. On the release of the nut $l$ the cone $e'$ is pressed by the elasticity of the balls, so as to bring the teeth of the racks on the nut $h$ and cone $e'$ into proper engagement. These arrangements offer the following advantages:

First. By reason of each ball being held in its own recess each of the said balls in turn is compressed when it passes beneath the socket during the rotation of the wheel, while, on the contrary, the uppermost balls are somewhat relieved of pressure. When the balls pass along the sides, they are inflected without slipping in their recesses.

Second. By reason of the clearly-determined position of the series of elastic balls and their distance apart great stability of the wheel is obtained without detracting from the appearance of the wheel and while permitting the vertical, lateral, and oblique shocks to be absorbed.

Third. The certainty of the wheel driving the socket without fear of this part sliding on the caoutchouc.

Fourth. In the event of damage one or more balls can be easily replaced and at a low cost instead of requiring a complete new outfit.

It is to be understood that the arrangements hereinbefore described can be also applied to ball-bearing hubs or to metallic wheels with tension-spokes, as well as to motor-car wheels or the wheels of velocipedes or of ordinary animal-traction vehicles. Also the balls may be spheres, polyhedrons, or even cylinders of india-rubber or other suitable elastic material having analogous properties.

I also wish it to be understood that I may vary the form, size, details, and materials employed in the construction of my apparatus without departing from the nature of my said invention.

I claim—

In a vehicle-wheel, the combination of a socket or sleeve in which the axle turns, an exterior socket to which the spokes of the wheel are secured, the exterior socket inclosing the first-named socket and having segmental recesses formed in the interior thereof, yielding balls fitted in said recesses, and cones secured on the first-named socket or sleeve within the exterior socket, such cones serving to hold the yielding balls, whereby to mount the exterior socket upon the interior socket.

The foregoing specification of my improvements in antivibratory elastic naves for vehicle-wheels signed by me this 13th day of April, 1899.

CASIMIR CONSTANT BALLIN.

Witnesses:
EDWARD P. MACLEAN,
MAURICE HENRI PIGNET.